Patented Mar. 17, 1936

2,034,531

UNITED STATES PATENT OFFICE 2,034,531

STABILIZATION AND PRESERVATION OF RUBBER LATEX

Alfred Thomas Blakey Kell, Beckenham, England

No Drawing. Application August 8, 1935, Serial No. 35,305. In Great Britain November 11, 1933

9 Claims. (Cl. 18—50)

This invention is for improvements in or relating to the stabilization and preservation of rubber latex. One object of the invention is to provide a method of stabilization which is a useful alternative to the methods at present in use. A further object is to enable the stabilized latex to be subjected to more drastic treatment than is possible with rubber latex having the normal anti-coagulants mixed therewith. Thus, the stabilized latex may be subjected to processes of concentration which involve heat treatment without coagulating and it may be mixed with large proportions of fillers which normally coagulate latex.

It has been found that the stability mentioned above may be conferred on latex by incorporating in the latex a proportion of an aqueous solution of a soluble alkali silicate together with potassium carbonate.

The present invention accordingly comprises a process for stabilizing rubber latex against coagulating influences which consists in mixing with the latex an aqueous solution of potassium or sodium silicate and potassium carbonate. As compared with the common anti-coagulants such as ammonia the present stabilizing mixture possesses the advantage that it is non-volatile and is therefore retained in the latex even when the latter is subjected to heating.

The stabilizing solution may consist of silicate and carbonate in the proportion of 10 parts by weight of silicate to two parts by weight of carbonate.

In one form of the invention the aqueous solution of silicate and potassium carbonate may be made up with water acidulated with hydrochloric acid e. g. with 1% by weight of hydrochloric acid and this form of the invention is particularly useful when the stabilized latex is to be mixed with fillers.

When rubber latex is to be stabilized for transport or concentration purposes the weight of the sodium silicate and potassium carbonate preferably amount to from 2 to 4% on the weight of the dry rubber content of the latex. Latex containing stabilizer in these proportions may be maintained in the liquid state for long periods without other special precautions and may be concentrated by centrifuging, evaporation or filtration up to a dry rubber content of the order of 85%. Again, relatively large proportions of fillers may be incorporated without bringing about the coagulation of the latex.

Among the fillers which may be employed may be mentioned compounds of potassium, sodium, magnesium, calcium, zinc, aluminium, silicon, sulphur or carbon. In preparing a mixture of latex and fillers it is preferable to mix the filler with a portion of the stabilizing solution (containing a proportion of hydrochloric acid) and to incorporate this mix with the latex containing the remainder of the stabilizing solution.

Among the fillers which may be employed may be mentioned lithopone, magnesite, calcium carbonate, hydrated magnesium silicate, titanium white, zinc white or Portland cement. Mixtures of these substances may be used.

The term "rubber latex" as employed in this specification includes natural latex, vulcanized latex or artificial aqueous dispersions of rubber.

Following is a description by way of example of a stabilizing solution suitable for stabilizing rubber latex for transport or concentration.

2 parts by weight of potassium carbonate and 10 parts by weight of potassium silicate are dissolved in 4 parts by weight of water. An amount of this solution is added to latex so that the proportion of salts amounts to about 3% on the dry rubber content of the rubber in the latex. The water employed for making up the solution is preferably soft but the invention may be carried out, if desired, with the use of hard water.

In one example of the preparation of a latex mix containing fillers 15 parts by weight of potassium silicate, 5 parts by weight of lithopone and 0.5 parts by weight of magnesite are mixed together and to the mixture is added 30 parts calcium carbonate, 10 parts precipitated silica, and 5 parts of hydrated magnesium silicate. The mixture is ground together with 10 parts by weight of a solution of potassium silicate and potassium carbonate acidulated with 1% of hydrochloric acid. If desired, the potassium silicate may be replaced by a chemically equivalent amount of sodium silicate. The mixture can be worked with trowel and shovel like concrete and sets to a solid mass still possessing a certain degree of resilience.

In a further example of a stabilized mixture rubber latex is stabilized with 5% by weight of a solution containing potassium silicate and potassium carbonate in the proportions mentioned above and the mixture is concentrated by a heating process. The concentrated and stabilized latex is mixed with four times its weight of fillers also mixed with a proportion of the stabilizing solution.

The invention may be applied not only to latex as it is obtained from the tree but also to latex which has been treated with a solution of ammonia. The subsequent loss of the ammonia, e. g. when the latex is subjected to a step of concentration does not adversely affect the stability of the latex. The invention may also be applied to certain of the forms of latex which have previously been subjected to a concentrating step.

It has been found that the amount of stabilizing solution need not in general exceed 10% and in some cases as little as 1 to 2% may be employed. In the majority of cases acid may be omitted with little or no disadvantage and when fillers are absent it is advantageous to omit the acid.

I claim:

1. A process for stabilizing and preserving an aqueous dispersion of rubber against coagulating influences which comprises mixing with the aqueous dispersion of rubber an aqueous solution containing a soluble alkali silicate and potassium carbonate.

2. A process for stabilizing and preserving rubber latex against coagulating influences which comprises mixing with the latex an aqueous solution containing a soluble alkali silicate and potassium carbonate.

3. The process of claim 2 wherein the aqueous solution contains an amount of soluble alkali silicate of the order of ten parts by weight to two parts by weight of potassium carbonate.

4. The process of claim 2 wherein the aqueous solution contains not more than ten percent of solid, calculated on the dry rubber content of the latex.

5. The process of claim 2 wherein the aqueous solution contains potassium silicate.

6. The process of claim 2 wherein the solution contains sodium silicate.

7. A process of stabilizing and preserving rubber latex against coagulating influences which comprises mixing with the latex an aqueous solution containing a soluble alkali silicate and potassium carbonate, and then subjecting the mixture to a concentrating step.

8. A process for the stabilization of a rubber composition in which the latex is present in the uncoagulated state which comprises treating filling materials with an aqueous solution containing a soluble alkali silicate and potassium carbonate, and thereafter mixing the treated fillers with latex which has itself been treated with an aqueous solution containing a soluble alkali silicate and potassium carbonate.

9. The process of claim 8 wherein the filling materials are acidulated with a proportion of hydrochloric acid prior to mixing these filling materials with the latex of the order of one percent calculated on the combined weight of the soluble alkali silicate and potassium carbonate.

ALFRED THOMAS BLAKEY KELL.